(12) United States Patent
Uchibori et al.

(10) Patent No.: US 7,915,534 B2
(45) Date of Patent: Mar. 29, 2011

(54) GROMMET

(75) Inventors: Masanori Uchibori, Shiga (JP); Kyo Karino, Shiga (JP); Daisuke Watanabe, Shiga (JP); Tetsuya Mitani, Wako (JP)

(73) Assignees: The Furukawa Electric Co., Ltd., Tokyo (JP); Furukawa Automotive Systems Inc., Inukami-gun (JP); Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 12/208,022

(22) Filed: Sep. 10, 2008

(65) Prior Publication Data

US 2009/0065235 A1 Mar. 12, 2009

(30) Foreign Application Priority Data

Sep. 11, 2007 (JP) ................. 2007-235876
Sep. 11, 2007 (JP) ................. 2007-235877

(51) Int. Cl.
*H01B 17/26* (2006.01)
(52) U.S. Cl. ............ 174/152 G; 174/153 G; 174/152 R; 174/151; 174/654; 174/668; 16/2.1; 277/628
(58) Field of Classification Search ............. 174/152 G, 174/153 G, 152 R, 151, 654, 658, 668; 16/2.1, 16/2.2; 248/56; 439/628; 277/628
See application file for complete search history.

(56) References Cited

U.S. PATENT DOCUMENTS 6,685,195 B2 * 2/2004 Uchida et al. ................. 277/628

FOREIGN PATENT DOCUMENTS

| JP | 5-57574 | 7/1993 |
|---|---|---|
| JP | 7-183671 | 7/1995 |
| JP | 9-129067 | 5/1997 |
| JP | 11-41756 | 2/1999 |
| JP | 2003-111250 | 4/2003 |
| JP | 2003-134644 | 5/2003 |
| JP | 2003-235131 | 8/2003 |
| JP | 2004-215334 | 7/2004 |

OTHER PUBLICATIONS

Office Action issued Sep. 7, 2010, in Japanese Patent Application No. 2008-232526.

* cited by examiner

*Primary Examiner* — Dhiru R Patel
(74) *Attorney, Agent, or Firm* — Oblon, Spivak, McClelland, Maier & Neustadt, L.L.P.

(57) ABSTRACT

In a grommet (1), a centering unit and a temporary anchor unit are provided on an outer surface of a grommet inner member (2). The centering unit includes a plurality of centering portions (e.g., centering claws 8) configured to elastically abut on an attachment panel (20) at an inner edge thereof around an insertion hole (21) so as to position the grommet inner member (2) in a center of the insertion hole (21). The temporary anchor unit includes a plurality of engaging portions (e.g., temporary anchor claws 7) configured to engage with the inner edge of the attachment panel (20), thereby supporting the grommet (1) in an axial direction thereof before lock portions (e.g., lock claws 6) make the grommet inner member (2) retained at the inner edge of the attachment panel (20) around the insertion hole (21) when the grommet inner member (2) is inserted into the insertion hole (21).

12 Claims, 7 Drawing Sheets

GROMMET

BACKGROUND OF THE INVENTION

This application claims the entire benefit of Japanese Patent Application Numbers 2007-235876 and 2007-235877 which were filed on Sep. 11, 2007, the entirety of which is incorporated by reference.

FIELD OF THE INVENTION

This invention relates to a grommet for use with an attachment panel provided in an automobile, to hold a wire harness or the like passing through the attachment panel.

DESCRIPTION OF RELATED ART

When a wire harness is drawn through an insertion hole provided in an attachment panel, for example, in an automobile, a grommet is employed for preventing damage to the wire harness, rendering the insertion hole waterproof and/or soundproof, or other purposes like these. The grommet is, for example, composed of a hard grommet inner member made of plastic and a soft grommet outer member made of rubber, for example, as disclosed in Japanese Laid-Open Utility Model Application, Publication No. 5-57574 (Patent Document 1). The grommet inner member is shaped like a cylinder adapted to be loosely fitted in the insertion hole, with a plurality of lock claws (lock portions) located adjacent to one end of the grommet inner member and projecting outwardly from an outer cylindrical surface thereof, and a flange portion projecting outwardly from the other end of the grommet inner part. On the other hand, the grommet outer member has an integral structure consisting of a collar portion capable of being fitted on the flange portion of the grommet inner member, and a cylindrical base portion provided contiguously with the collar portion and having a diameter smaller than that of the grommet inner member.

Accordingly, when a grommet inner member with which a grommet outer member is combined is inserted into the insertion hole, and the lock claws are engaged with an inner edge of the attachment panel around the insertion hole, the grommet inner member is fitted in the insertion hole. At the same time, the collar portion of the grommet outer member is pressed against the attachment panel so that sealing is provided between the collar portion of the grommet outer member and the flange portion of the grommet inner member. In the grommet described in this Patent Document 1, in order to facilitate fitting of the grommet inner member into the insertion hole around which a burr is formed, recesses having sloped portions for receiving the lock claws are provided in the burr. When the grommet of which the lock claws have been fitted in the recesses is turned, the grommet inner member can properly be moved into an appropriate fitting position because the lock claws are guided by the sloped portions of the recesses.

Another example of the grommet, as disclosed in Japanese Laid-Open Patent Application, Publication No. 11-41756 (A) (Patent Document 2), having a vehicle body engaging groove, further has a recess formed circumferentially around a tapering outer surface of the grommet for temporarily fitting the grommet in the insertion hole. When the recess has been fitted on an inner edge of a vehicle body around an insertion hole thereof, the grommet can be turned on a point of this recess at which the inner edge around the insertion hole is fitted therein, so that the grommet can be fitted into the vehicle body engaging groove with a reduced force.

In cases where such a grommet as described above is employed for an insertion hole having an angled burr or the like such that the difference between the maximum and minimum diameters of the insertion hole is nonnegligible, or an insertion hole having no burr but dimensioned with insufficient accuracy, a backlash would be produced between the grommet inner member and the insertion hole in directions parallel to the attachment panel. As a result, a rattle, and unfavorable dislocation or rotation of the grommet would be caused even after the lock claws have engaged with the attachment panel. Due to this, vibration of the vehicle body is produced, which causes the lock claws to be disengaged or the like, and/or the waterproof and soundproof properties are diminished. It would be conceivable that the number of lock claws could be increased for the purpose of properly positioning (centering) the grommet in the insertion hole in the directions parallel to the attachment panel. However, this would produce a larger reaction force of the lock claws when the grommet is fitted into the insertion hole, and thus a larger force for fitting the grommet is required. Consequently, the ease of operation upon attachment of the grommet would be impaired significantly.

For the grommet as such, a combination type composed of a hard grommet inner member and a soft grommet outer member, as disclosed in Patent Document 1, is typically adopted to ensure a good fit and to increase a sealing capability. However, operation of fitting a plurality of lock claws provided on the hard grommet inner member at a time into the insertion hole would require a large fitting force. Therefore, the grommet would have to be inserted obliquely relative to the attachment panel at first, and should be held by one hand while the lock claws are being manipulated one by one by the other hand. Thus, not only it takes much time to complete the fitting operation, but also the grommet could be fixed eventually in an undesirable oblique position; for this or other reasons, the position of the grommet fitted in the insertion hole could disadvantageously be unstable. The grommet disclosed in Patent Document 2 is premised on deformation during its fitting operation. Therefore, a soft grommet made of rubber or elastomer should be adopted, and it would be inappropriate to apply it to the grommet having a hard grommet inner member, because no reduction in the fitting force could be expected even if a recess for temporarily fitting the grommet in the insertion hole were provided therein. Thus, the disadvantage of unstable position of the grommet fitted in the insertion hole could not be eliminated.

The present invention has been made in an attempt to eliminate the above disadvantages, and illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an object to provide a grommet in which the ease of operation upon attachment is not impaired and which can be positioned in an insertion hole without backlash, so that it can be securely attached in an appropriate position, even in cases where the dimensional accuracy of the insertion hole is insufficient.

Another object of the present invention is to provide a grommet which can be fitted into the insertion hole easily with a reduced fitting force even if the grommet is made of a hard material, and which can be securely attached in an appropriate posture or position.

To achieve the above described objects, one aspect of the present invention is a grommet which comprises a tubular grommet inner member and a tubular grommet outer member. The tubular grommet inner member is inserted into an insertion hole formed in an attachment panel and comprises a plurality of lock portions which are provided on an outer surface of the grommet inner member and configured to render the grommet inner member retainable at an inner edge of the attachment panel around the insertion hole from a first surface of the attachment panel. The tubular grommet outer member is attached coaxially to an end of the grommet inner member from a second surface of the attachment panel and is configured to abut on the attachment panel to provide sealing between the grommet inner member and the attachment panel. The grommet inner member further comprises at least one of a centering unit and a temporary anchor unit provided on the outer surface of the grommet inner member. The centering unit comprises a plurality of centering portions configured to elastically abut on the attachment panel at the inner edge thereof around the insertion hole so as to position the grommet inner member in a center of the insertion hole when the grommet inner member is inserted into the insertion hole. The temporary anchor unit comprises a plurality of engaging portions configured to engage with the inner edge of the attachment panel around the insertion hole, thereby supporting the grommet in an axial direction thereof before the lock portions make the grommet inner member retained at the inner edge of the attachment panel around the insertion hole when the grommet inner member is inserted into the insertion hole.

Additionally, in one embodiment of the present invention, each of the centering portions may be an elastic piece which projects outwardly from the outer surface of the grommet inner member and has elasticity directed essentially only in a direction parallel to the attachment panel (first additional feature).

According to another embodiment of the present invention, additionally or alternatively, the plurality of lock portions and the plurality of engaging portions of the temporary anchor unit may be configured as elastic pieces each of which projects in a direction opposite to a direction of insertion of the grommet inner member, and comprises an engageable step portion disposed at an end thereof and configured to engage with the inner edge of the attachment panel around the insertion hole; and positions of the engageable step portions of each lock portion and each engaging portion may be displaced from each other in the direction of insertion of the grommet inner member (second additional feature).

According to yet another embodiment of the present invention, additionally or alternatively, the grommet inner member may comprise an assembly of two split halves of which split faces extend in an axial direction, and at least one of the lock portions and at least one of the centering unit and the temporary anchor unit is provided on the outer surface of each split half (third additional feature).

According to yet another embodiment of the present invention, additionally or alternatively, the insertion hole and the grommet inner member may be each shaped like an oblong circular figure (fourth additional feature).

According to yet another embodiment of the present invention, additionally or alternatively, a burr sloped inwardly may be formed around the insertion hole, and each centering portion may be configured to elastically abut on an inner edge of the burr (fifth additional feature).

According to yet another embodiment of the present invention, additionally or alternatively, a burr sloped inwardly may be provided around the insertion hole, and each engaging portion of the temporary anchor unit may be configured to engage with an inner edge of the burr (sixth additional feature).

The above aspect of the present invention with or without any of the additional features may exert the following advantageous effects.

According to the above aspect of the present invention, with the centering unit (centering portions) adopted in addition to the lock portions, even if the insertion hole has an angled burr or dimensional accuracy of the insertion hole is insufficient, the grommet can be properly positioned in the insertion hole without backlash and securely attached to the attachment panel in an appropriate position without impairing the ease of operation upon attachment.

Furthermore, with the temporary anchor unit adopted, the grommet can be brought into a temporarily anchored state by the temporary anchor unit (the engaging portions thereof). Thus, the grommet can be kept in an appropriate posture before it is finally fitted into the insertion hole, so that the grommet can be positioned in a proper fitting position where the lock portions engage with the inner edge of the attachment panel. Accordingly, even in cases where the grommet inner member is made of hard material, the grommet can be manipulated easily with a reduced force, and can be kept in an appropriate fitting posture during its fitting operation. Thus, the grommet can be fitted reliably into the insertion hole.

In a particular embodiment with the first additional feature as described above, where each of the centering portions is configured as an elastic piece of which the elasticity is directed essentially only in a direction parallel to the attachment panel, the increase in the reaction force received during the fitting operation by the addition of the centering portions can be minimized. Therefore, the loss of easy operability upon attachment of the grommet can be prevented.

In the embodiment with the second additional feature as described above, where the lock portions and the engaging portions of the temporary anchor unit are configured as elastic pieces with engageable step portions, whereas the engageable step portions of each lock portion and each engaging portion are displaced from each other, the lock portions and the engaging portions of the temporary anchor unit can be formed with increased ease, and the setting of the position in which the grommet is to be temporarily anchored can be performed with increased ease.

In the embodiment with the third additional feature as described above, where the grommet inner member is configured to be an assembly of two split halves, even if the grommet inner member is made of hard material, it can be anchored easily with a wire harness held between the split halves. The split structure of the split halves serves to ensure an uniform anchoring force both in the axial direction and in the direction parallel to the attachment panel.

In the embodiment with the fourth additional feature as described above, where the insertion hole and the grommet inner member are each shaped like an oblong circular figure, an undesirable rotation of the grommet 1 can be effectively prevented.

In the embodiment with the fifth or sixth additional feature as described above, even if the burr is angled such that the difference between the maximum and minimum diameters of the insertion hole is nonnegligible due to tolerances, the accurate positioning can be performed with the help of the centering portions, and the temporary anchoring can be achieved reliably by means of the temporary anchor unit (engaging portions thereof).

BRIEF DESCRIPTION OF THE DRAWINGS

The above aspects, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

Exemplary embodiments of the present invention will be described hereinafter with reference to the accompanying drawings.

Figure 1:
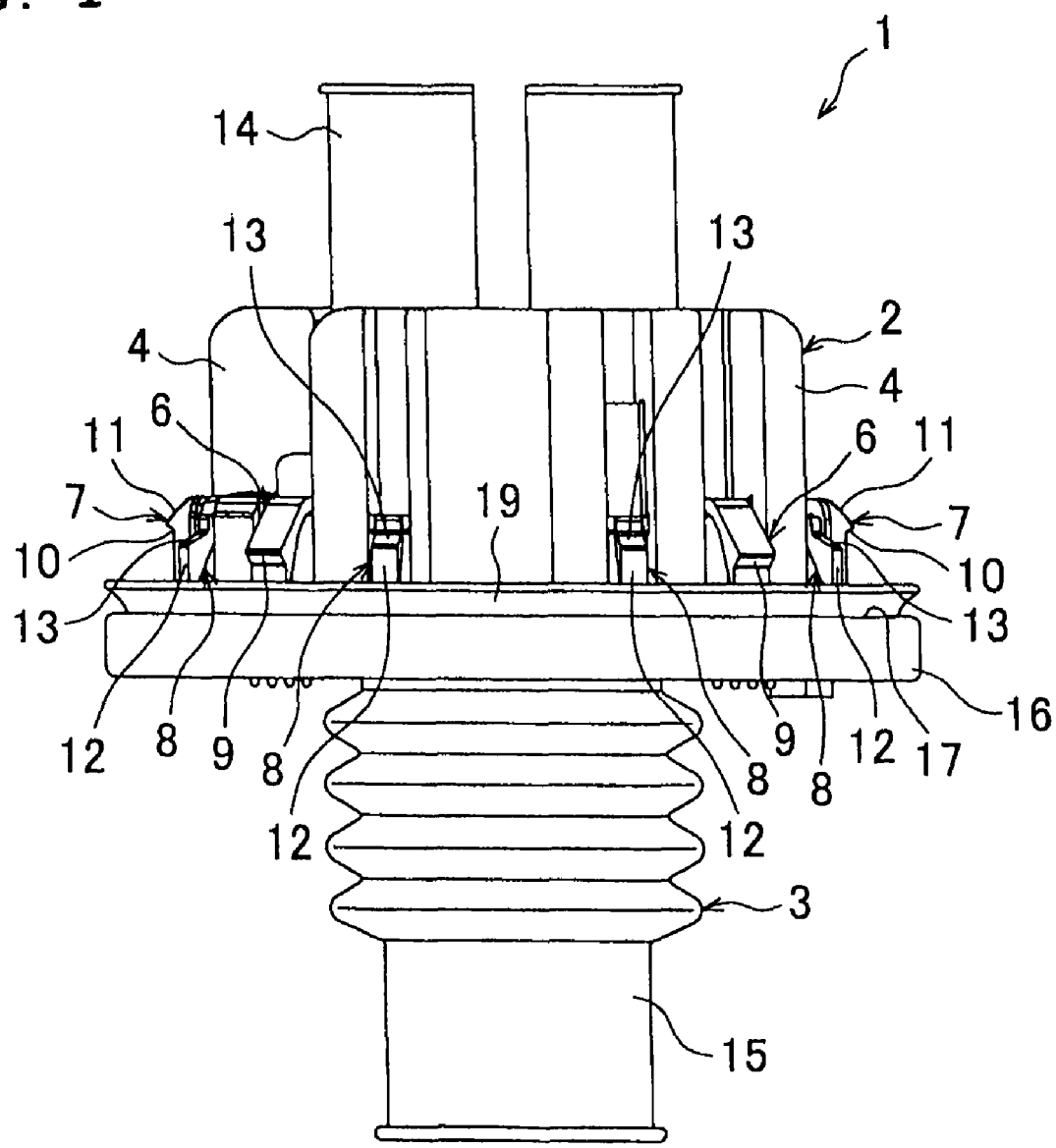
FIG. 1 is a side view of a grommet according to an exemplary embodiment of the present invention.
Figure 2:
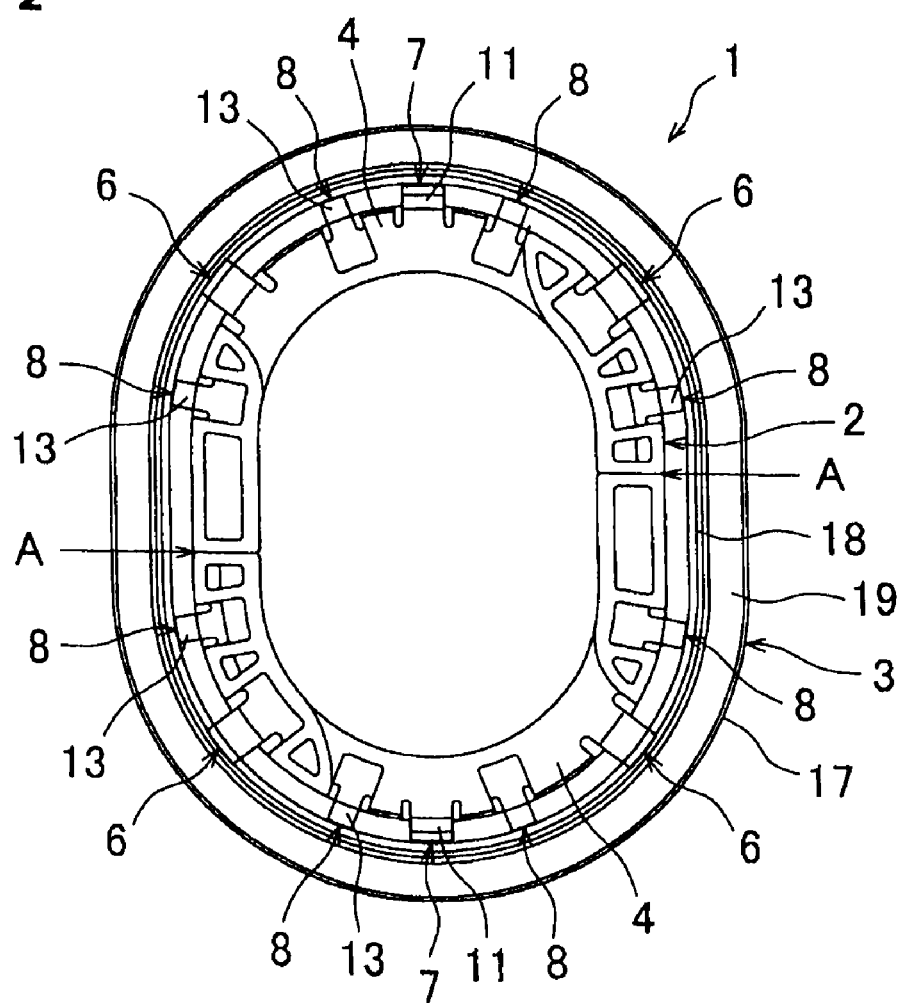
FIG. 2 is a plan view of the grommet.
Figure 3A:
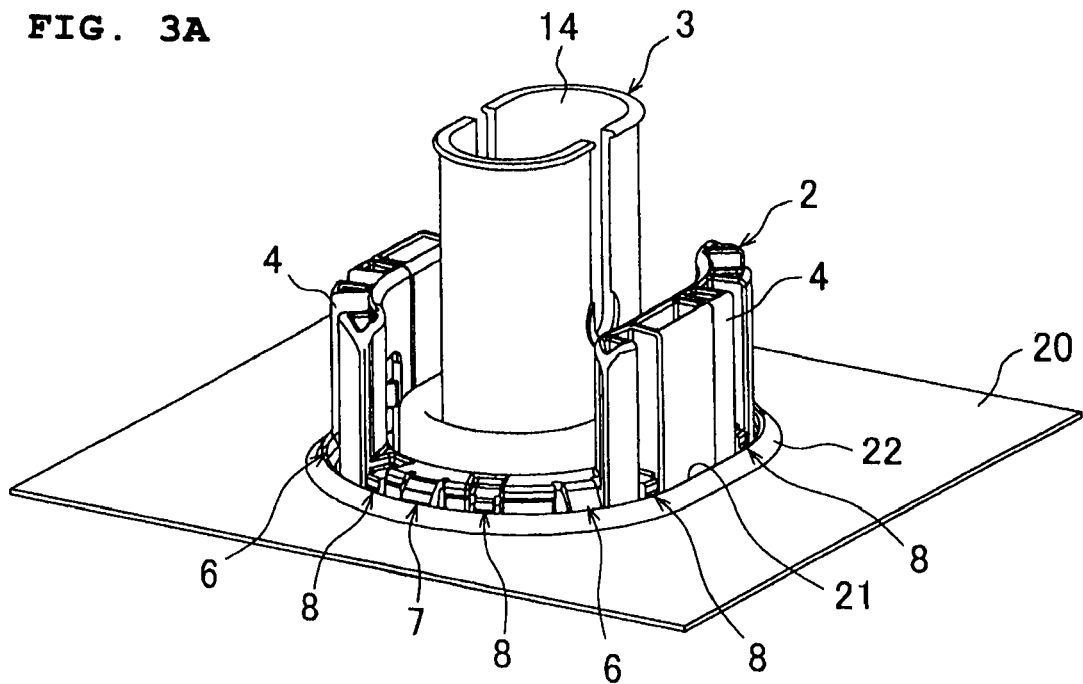
FIG. 3A is a perspective view of the grommet for explaining a temporarily anchored state of the grommet.
Figure 3B:
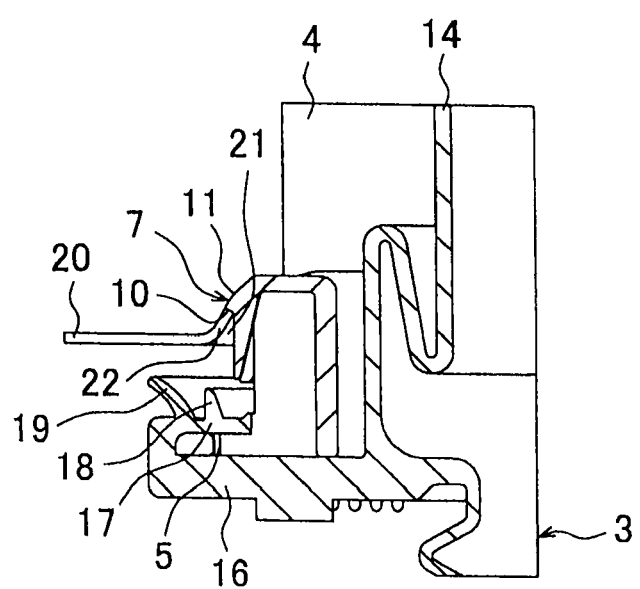
FIG. 3B is an enlarged sectional view of a portion of the grommet around a temporary anchor claw for explaining the temporarily anchored state of the grommet.

Referring now to FIGS. 1 and 2, in which one example of a grommet according to an exemplary embodiment of the present invention is shown, a grommet 1 comprises a hard grommet inner member 2 made of plastic, and a soft grommet outer member 3 made of rubber. The grommet inner member 2 has a tubular body having an oblong circular figure, as viewed from top (see FIG. 2), contoured to fit an insertion hole of an attachment panel which will be described later. In this embodiment, the grommet inner member 2 is split at a plane along its minor axis (indicated by position A in FIG. 2) into two halves 4, and an engageable piece (not shown) projecting from a split end face of one of the two split halves 4 is inserted into a recess (not shown) provided in a corresponding split end face of the other of the two split halves 4, so that the two split halves 4 are combined together to form an integral structure of the grommet inner member 2. Denoted by reference numeral 5 is a flange portion provided around a lower end of each of the two split halves 4 (which are illustrated in FIGS. 3A, 3B, 4A and 4B).

On an outer surface of each split half 4, two lock claws 6, which form lock portions consistent with the present invention, one temporary anchor claw 7 which forms a temporary anchor unit consistent with the present invention, and four centering claws 8, which form centering portions consistent with the present invention are provided.

The lock claws 6 are elastic pieces which are disposed in, and project downward from, positions symmetric with respect to the major axis of the grommet inner member 2. Each lock claw has an engageable step portion 9 formed at a lower end thereof, the engageable step portion 9 is provided to engage with an inner edge of a burr around the insertion hole of the attachment panel whereby the grommet inner member 2 is properly positioned.

The temporary anchor claw 7 is an elastic piece which is disposed in, and projects downward from, a position on the major axis of the grommet inner member 2. The temporary anchor claw 7 has a temporary engageable step portion 10, like the engageable step portion 9 of each lock claw 6, to engage with the inner edge of the burr. This temporary engageable step portion 10 is disposed at a level higher than that of the engageable step portion 9 of the lock claw 6 (i.e., in a forward position with respect to the direction of insertion of the grommet inner member 2). The temporary anchor claw 7 has a tapered surface 11 which is disposed upwardly of the temporary engageable step portion 10 and sloped radially inwardly relative to the upward direction.

The centering claws 8 are elastic pieces which are disposed in positions closer to the ends (split end faces) of each split half than those of the lock claws 6 and in positions circumferentially adjacent to the temporary anchor claw 7 such that the claw 7 is arranged between the two adjacent claws 8, and each of which projects therefrom in a obliquely outward and downward direction. At an outer surface of each centering claw 8, a vertical pressing surface 12 and a tapered surface 13 which extends from the pressing surface 12 and is sloped radially inwardly relative to the upward direction are formed.

The lock claws 6, the temporary anchor claw 7 and the centering claws 8 are arranged on any of the concentric circles with the same center as that of a semicircular portion of each split half 4, whereas the pressing surface 12 of each centering claw 8 is located on the outermost circle, and a surface of each lock claw 6 extending downward from the lower edge of the engageable step portion 9 is located on a second circle inwardly of this outermost circle, and a surface of the temporary anchor claw 7 extending downward from the lower edge of the temporary engageable step portion 10 is located on a third circle inwardly of the second circle.

On the other hand, the grommet outer member 3 comprises a first tubular portion 14 having an oblong circular figure in section, being loosely fitted in the grommet inner member 2, a second tubular portion 15 having a circular figure in section and partially pleated like an accordion, and a cover portion 16 having a larger-diameter oblong circular figure and located between the first and second tubular portions 14 and 15. At a first tubular portion 14 side of the cover portion 16, a folded portion 17 which covers the flange portion 5 of the grommet inner member 2 from outside is formed. On an outside of the folded portion 17, inner 18 and outer 19 lips are formed, the inner lip 18 having an oblong circular figure as viewed from top and extending obliquely in a radially outward direction relative to the upward direction, and the outer lip 19 having an oblong circular figure as viewed from top and extending obliquely in a radially outward direction relative to the upward direction at a tilt angle larger than that of the inner lip 18.

An operation of attachment of the grommet 1 configured as described above into an insertion hole 21 of the attachment panel 20 around which a burr 22 sloped inwardly will be explained referring to FIGS. 3A, 3B, 4A and 4B.

At the outset, the split halves 4 of the grommet inner member 2 are combined together with a wire harness (not shown) held therebetween to make a grommet inner member 2 ready for attachment. Thereafter, the cover portion 16 of the grommet outer member 3 through which the wire harness are drawn is fitted on the flange portion 5 of the grommet inner member 2 to form an integral assembly (grommet 1) of the grommet inner and outer members 2 and 3.

Figure 4A:
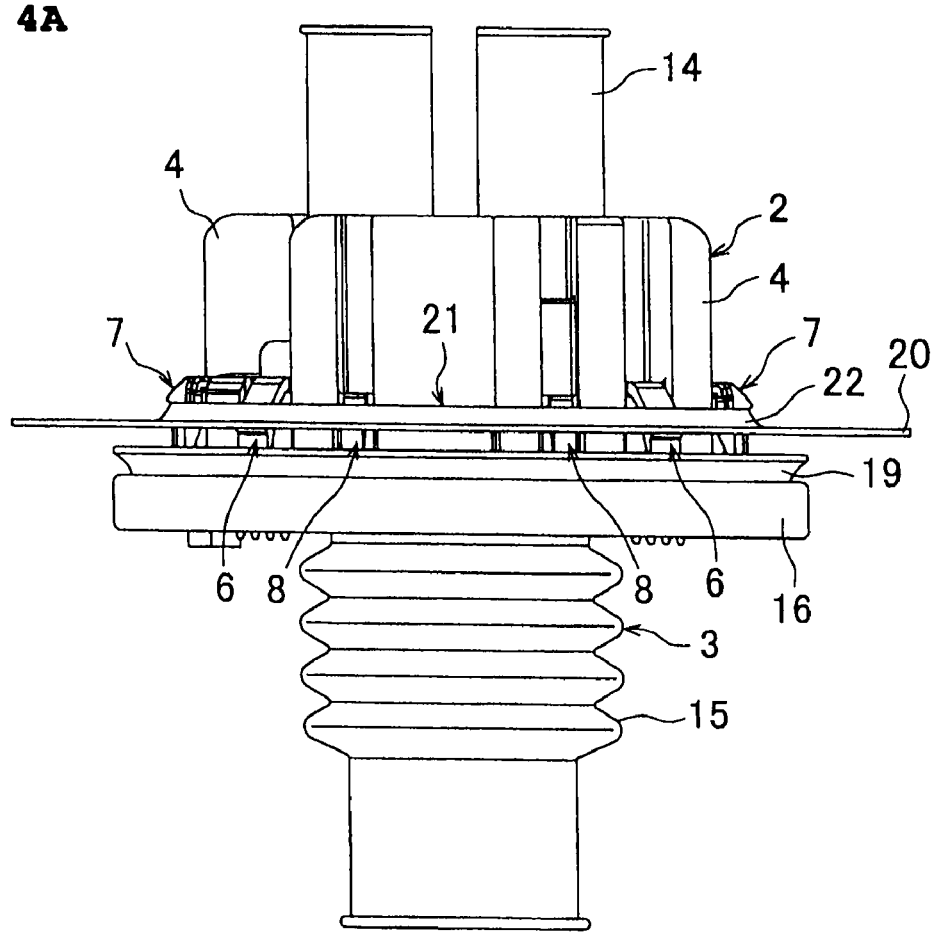
FIG. 4A is a side view of the grommet for explaining the temporarily anchored state of the grommet.
Figure 4B:
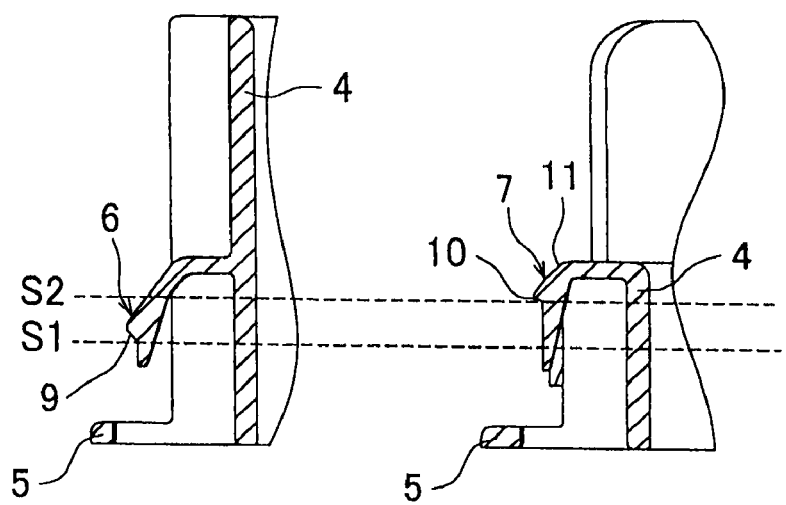
FIG. 4B is an enlarged sectional view of a lock claw and a temporary anchor claw of the grommet for explaining relative positions thereof.

The grommet 1 thus formed is oriented with its first tubular portion 14 facing forward, and is inserted from a side opposite to the surface of the attachment panel 20 facing toward the direction in which the burr 22 projects, into the insertion hole 21. Subsequently, the grommet inner member 2 is fitted into the insertion hole 21. Then, the tapered surface 11 of the temporary anchor claw 7 located at the uppermost position is brought into contact with the burr 22 first. Once the burr 22 passes over the tapered surface 11, the grommet 1 comes in the temporary anchored state as shown in FIGS. 3A, 3B, 4A and 4B where the temporary engageable step portion 10 engages with the inner edge of the burr 22 with the grommet 1 retained in an upright position relative to the attachment panel 20. At this stage, the inner lip 18 and the outer lip 19 of the grommet outer member 3 are kept out of contact with the attachment panel 20. Moreover, as shown in FIG. 4B, the engageable step portion 9 of the lock claw 6 is then located between a lower side position S1 of the attachment panel 20 and an inner edge position S2 of the burr 22, and thus still does not engage with the inner edge of the burr 22. In this temporary anchored state, the anchoring force of the grommet 1 is so low that the angle and/or position of the attached grommet 1 relative to the insertion hole 21, or the like can be easily checked and adjusted.

Figure 5:
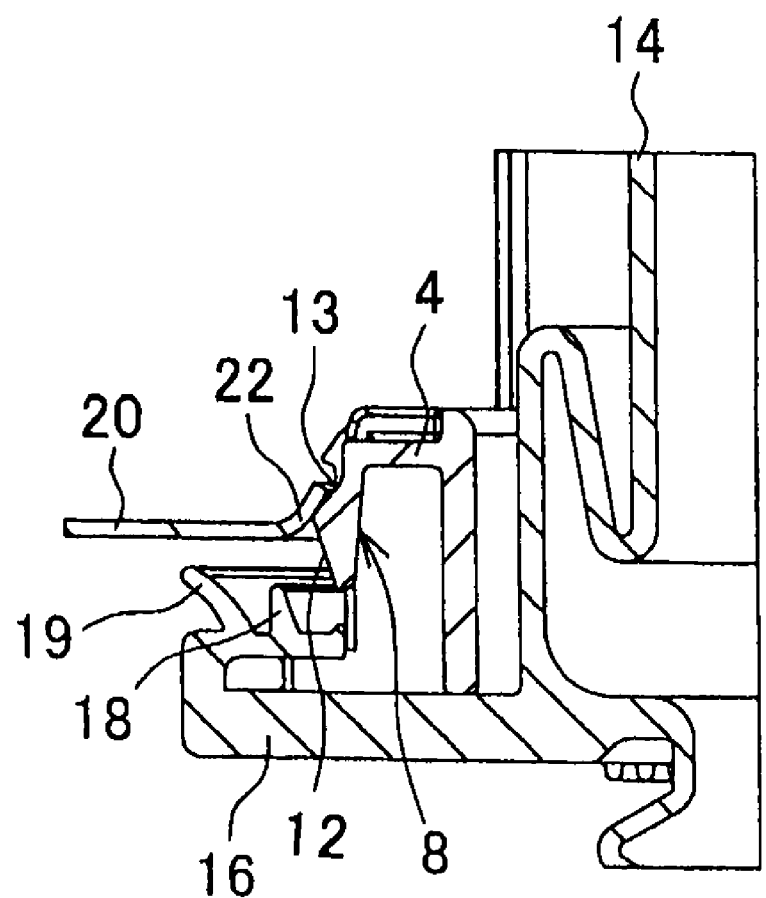
FIG. 5 is an enlarged sectional view of a portion of the grommet around a centering claw.

Next, when the grommet 1 in the temporary anchored state is further pushed into the insertion hole 21, the burr 22 comes in contact with the tapered surfaces 13 of the centering claws 8, and each of the centering claws 8 elastically deforms inwardly, as shown in FIG. 5. With this elastic deformation of the centering claws 8, the grommet inner member 2 is centered and positioned in the center within the insertion hole 21.

Figure 6A:
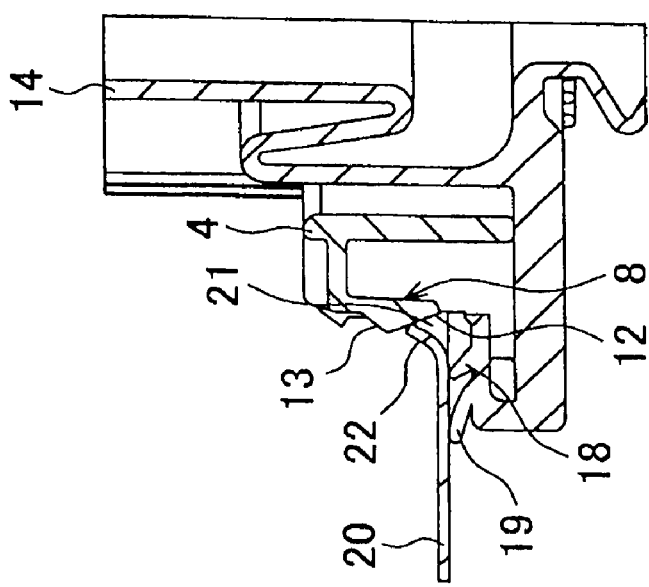
FIG. 6A is an enlarged sectional view of the portion of the grommet around the centering claw for explaining an anchored (locked) state of the grommet.
Figure 6B:
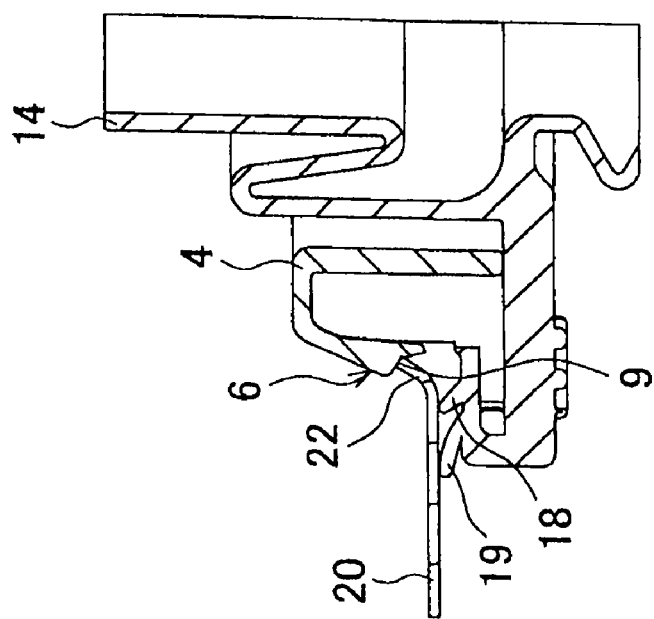
FIG. 6B is an enlarged sectional view of a portion of the grommet around the lock claw for explaining the anchored (locked) state of the grommet.
Figure 7:
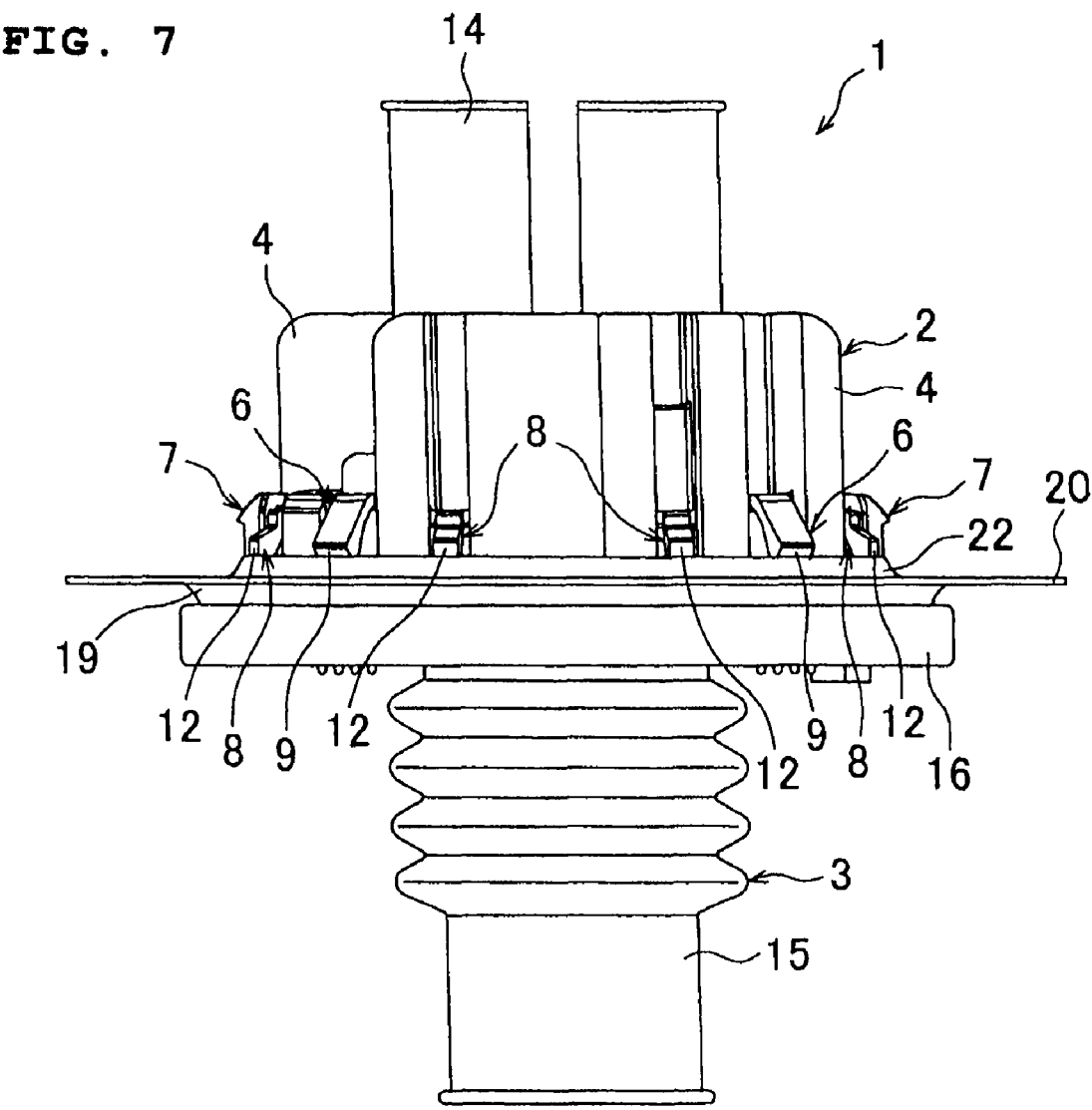
FIG. 7 is a side view of the grommet in the anchored (locked) state.

When the grommet 1 is further pushed into the insertion hole 21, the end of the burr 22 passes over the tapered surfaces 13 of the centering claws 8, and the pressing surfaces 12 of the centering claws 8 in turn press the inner edge of the burr 22 as shown in FIG. 6A. In this state, as shown in FIGS. 6B and 7, the engageable step portion 9 of each lock claw 6 can be engaged with the inner edge of the burr 22. In this way, the grommet 1 is positioned in an appropriate posture by the temporary anchoring process, so that the grommet 1 does not have to be tilted much, and the lock claws 6 can be engaged in sequence at a relatively small tilt angle. This operation for engaging the lock claws 6 with the inner edge of the burr 22 can be performed by one hand which is holding the grommet 1.

When all the lock claws 6 are engaged with the inner edge of the burr 22 in such a manner as described above, the inner lip 18 and the outer lip 19 of the grommet outer member 3 abut on the underside of the attachment panel 20 so as to provide sealing between the cover portion 16 and the attachment panel 20. The process of engaging the lock claws 6 in the insertion hole 21 is carried out in a state where the grommet 1 is positioned appropriately by the centering claws 8, so that the grommet 1 can be fitted smoothly in an appropriate position without being tilted or decentered.

As described above, the grommet 1 according to the present embodiment comprises a plurality of centering claws 8 disposed on an outer surface of the grommet inner member 2 and adapted to elastically abut on the attachment panel 20 at the inner edge thereof around the insertion hole 21 so as to position the grommet inner member 2 in the center of the insertion hole 21; therefore, even in cases where the grommet 1 is employed for an insertion hole 21 having an angled burr 22, or having no burr but being dimensioned with insufficient accuracy, the grommet 1 can be positioned in the insertion hole 21 without backlash and without impairing the ease of operation upon attachment. Thus, the grommet 1 can be securely and easily attached in an appropriate position.

Moreover, according to the present embodiment, a plurality of temporary anchor claws 7 are provided on the outer surface of the grommet inner member 2, wherein the temporary anchor claws 7 are configured to engage with the inner edge of the burr 22, thereby supporting the grommet 1 in an axial direction thereof, before the lock claws 6 make the grommet inner member 2 retained at the inner edge of the burr 22 when the grommet inner member 2 is inserted into the insertion hole 21; therefore, the grommet 1 temporarily anchored by the temporary anchor claws 7 can be retained in an appropriate posture when the grommet 1 is about to be fitted in a position where the lock claws 6 are engaged with the inner edge of the burr 22. Accordingly, the grommet 1, even if it has a hard grommet inner member 2 used therein, can be fitted into the insertion hole 21 easily with reduced fitting force and attached securely in an appropriate position (posture).

In this embodiment, particularly, the centering claws 8 are elastic pieces which are shaped to project outward from the outer surface of the grommet inner member 2 and configured to have elasticity directed essentially only in a direction parallel to the attachment panel 20; therefore, even with the centering claws 8, the reaction force received during the fitting operation can be small enough to avoid the loss of its easy operability upon attachment of the grommet 1.

Moreover, the lock portions and the engaging portions of the temporary anchor unit are configured as the elastic pieces (lock claws 6 and temporary anchor claws 7, respectively) each of which projects in a direction opposite to the direction of insertion of the grommet inner member 2. Each lock claw 6 and each temporary anchor claw 7 comprise an engageable step portion 9 and a temporary engageable step portion 10, respectively, which are each disposed at an end of the corresponding claw 6 or 7, and are configured to engage with the inner edge of the burr 22. The positions of the engageable step portion 9 and the temporary engageable step portion 10 are displaced from each other in the direction of insertion of the grommet inner member 2. These configurations make it easy to form the lock portions and the engaging portions of the temporary anchor unit, and to set the temporarily anchored position.

On the other hand, the grommet inner member 2 is formed by assembling two split halves 4 of which the split faces extend in the axial direction, and the lock claws 6 and the temporary anchor claw 7 are provided on the outer surface of each split half 4; therefore, even if the grommet inner member is made of hard material, it can be anchored easily with a wire harness held between the split halves 4, and the split structure of the split halves 4 serves to make the anchoring force uniform in the axial direction and in the direction parallel to the attachment panel 20.

Furthermore, in the present embodiment, the insertion hole 21 and the grommet inner member 2 are each shaped like an oblong circular figure, so that an undesirable rotation of the grommet 1 can be effectively prevented.

In the present embodiment, the burr 22 sloped inwardly is formed around the insertion hole 21 (the inner edge of the attachment panel 20), and the centering claws 8 and the temporary anchor claws 7 are configured to abut on the inner edge of the burr 22. Therefore even if the burr 22 is angled such that the difference between the maximum and minimum diameters of the insertion hole 21 is nonnegligible due to tolerances, the positioning can be performed precisely with the help of the centering claws 8 and the temporary anchoring can be achieved by means of the temporary anchor claws 7.

The present invention is not limited to the above-described exemplary embodiment, and may be carried out into practice in various other ways. Thus, it is contemplated that various modifications and changes may be made to the exemplary embodiment of the invention without departing from the scope of the embodiments of the present invention as defined in the appended claims.

For example, the centering unit consistent with the present invention is not limited to the illustrated embodiment comprising eight centering claws in total, but it goes without saying that the number of the centering portions and their arrangement can be changed, and the shape thereof can be modified; for example, its outer surface can be curved, its width can be changed, or otherwise, where appropriate. Moreover, the lock claws and/or the temporary anchor claws may be designed differently in an analogous manner. Also, either of the centering unit or the temporary anchor unit may be omitted.

Furthermore, the basic structure of the grommet can also be modified; for example, as is the case with the insertion hole that is circular or elliptic, the grommet inner member and/or the tubular portion of the grommet outer member may be contoured to fit the insertion hole, i.e., may be shaped like a similar circular or elliptic figure, accordingly. The grommet consistent with the present invention may be employed for use with an attachment panel having an insertion hole without a burr, and can also be positioned appropriately with the help of the centering unit (centering portions).

In addition, the split structure of the grommet inner member may also be modified or changed; for example, the position in which the grommet inner member is split and the way in which the split halves are combined together may be modified where appropriate; alternatively, the split structure may be abandoned and the grommet inner member may be formed as a one-piece tubular body having a circular or oblong circular figure.

What is claimed is:

1. A grommet, comprising: a tubular grommet inner member—insertable into an insertion hole formed in an attachment panel, the grommet inner member comprising a plurality of lock portions provided on an outer surface of the grommet inner member and configured to position the grommet inner member at an inner edge of the attachment panel around the insertion hole from a first surface of the attachment panel; and a tubular grommet outer member attached coaxially to an end of the grommet inner member from a second surface of the attachment panel opposite the first surface, the grommet outer member configured to abut the attachment panel to provide sealing between the grommet inner member and the attachment panel, wherein the grommet inner member further comprises at least one of a centering unit and a temporary anchor unit provided on the outer surface of the grommet inner member, the centering unit comprising a plurality of centering portions configured to elastically abut on the attachment panel at the inner edge thereof around the insertion hole so as to position the grommet inner member in a center of the insertion hole when the grommet inner member is inserted into the insertion hole, the temporary anchor unit comprising a plurality of engaging portions configured to engage with the inner edge of the attachment panel around the insertion hole, thereby supporting the grommet inner member in an axial direction thereof before the lock portions position the grommet inner member at the inner edge of the attachment panel around the insertion hole when the grommet inner member is inserted into the insertion hole, the grommet inner member comprises an assembly of two split halves forming split faces extending in an axial direction, and the lock portions, the engaging portions and the centering portions are arranged on any of concentric circles with the same center as that of a semicircular portion of each of the two split halves.

2. The grommet according to claim 1, wherein each of the centering portions is an elastic piece which projects outwardly from the outer surface of the grommet inner member and has elasticity directed substantially only in a direction parallel to the attachment panel.

3. The grommet according to claim 2, wherein the plurality of lock portions and the plurality of engaging portions of the temporary anchor unit are elastic pieces each of which projects in a direction opposite to a direction of insertion of the grommet inner member, and comprise an engageable step portion disposed at an end thereof and configured to engage with the inner edge of the attachment panel around the insertion hole, and wherein positions of the engageable step portions of each of said lock portions and each of said engaging portions are displaced from each other in the direction of insertion of the grommet inner member.

4. The grommet according to claim 1, wherein the plurality of lock portions and the plurality of engaging portions of the temporary anchor unit are elastic pieces each of which projects in a direction opposite to a direction of insertion of the grommet inner member, and comprise an engageable step portion disposed at an end thereof and configured to engage with the inner edge of the attachment panel around the insertion hole, and wherein positions of the engageable step portions of each of said lock portions and each of said engaging portions are displaced from each other in the direction of insertion of the grommet inner member.

5. The grommet according to claim 4, wherein the engageable step portion of each engaging portion of the temporary anchor unit is disposed at a level higher than that of the engageable step portion of the lock portions with respect to a direction of insertion of the grommet inner member.

6. The grommet according to claim 1, wherein the grommet inner member comprises an assembly of two split halves forming split faces extending in an axial direction, and at least one of the lock portions, and at least one of the centering unit and the temporary anchor unit are provided on the outer surface of each split half.

7. The grommet according to claim 1, wherein the insertion hole and the grommet inner member each have an oblong circular shape.

8. The grommet according to claim 7, wherein the engaging portions are positioned along a major axis of the oblong shape of the grommet inner member.

9. The grommet according to claim 1, wherein a burr sloped inwardly is formed around the insertion hole, and each of said centering portions is configured to elastically abut an inner edge of the burr.

10. The grommet according to claim 1, wherein a burr sloped inwardly is formed around the insertion hole, and each of said engaging portions of the temporary anchor unit is configured to engage with an inner edge of the burr.

11. The grommet according to claim 1, wherein a pressing surface of each of said centering portions is located on an outermost circle of the concentric circles, and a surface of each of said lock portions extending downward from a lower edge of an engageable step portion of one of the lock portions is located on a second circle inwards of the outermost circle, the engageable step portion configured to engage with the inner edge of the attachment panel around the insertion hole.

12. The grommet according to claim 11, wherein a surface of the engaging portions extending downward from the lower edge of the engageable step portion of each of said engaging portions of the temporary anchor unit is located on a third circle inwards of the second circle.

* * * * *